(12) United States Patent
Shino et al.

(10) Patent No.: US 11,291,951 B2
(45) Date of Patent: Apr. 5, 2022

(54) EXHAUST GAS PURIFYING CATALYST FOR 2-STROKE GENERAL-PURPOSE ENGINES

(71) Applicant: CATALER CORPORATION, Kakegawa (JP)

(72) Inventors: Yoritsugu Shino, Kakegawa (JP); Tsuyoshi Ito, Kakegawa (JP); Keisuke Murashige, Kakegawa (JP); Akio Kubota, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 101 days.

(21) Appl. No.: 16/099,163

(22) PCT Filed: May 17, 2017

(86) PCT No.: PCT/JP2017/018561
§ 371 (c)(1),
(2) Date: Nov. 5, 2018

(87) PCT Pub. No.: WO2017/200013
PCT Pub. Date: Nov. 23, 2017

(65) Prior Publication Data
US 2019/0209967 A1 Jul. 11, 2019

(30) Foreign Application Priority Data
May 20, 2016 (JP) .............................. JP2016-101768

(51) Int. Cl.
*B01D 53/94* (2006.01)
*B01J 23/58* (2006.01)
(Continued)

(52) U.S. Cl.
CPC ....... *B01D 53/944* (2013.01); *B01D 53/8643* (2013.01); *B01D 53/8668* (2013.01);
(Continued)

(58) Field of Classification Search
CPC .............. B01D 53/944; B01D 53/8643; B01D 53/8668; B01J 23/002; B01J 23/56;
(Continued)

(56) References Cited

U.S. PATENT DOCUMENTS 4,152,301 A * 5/1979 Summers ............. B01D 53/945
423/213.5
5,260,249 A * 11/1993 Shiraishi .................. B01J 23/02
502/304

(Continued)

FOREIGN PATENT DOCUMENTS

EP 0142859 A2 * 5/1985 ............ B01J 37/024
JP 11-207183 A 8/1999
(Continued)

OTHER PUBLICATIONS

Jul. 4, 2017 International Search Report issued in International Patent Application No. PCT/JP2017/018561.
(Continued)

*Primary Examiner* — Alexandra M Moore
*Assistant Examiner* — Michael Forrest
(74) *Attorney, Agent, or Firm* — Oliff PLC (57) ABSTRACT

An exhaust gas purifying catalyst for 2-stroke general-purpose engines, which is characterized in that: the exhaust gas purifying catalyst includes a base and a coat layer on the base; the coat layer contains noble metals and metal oxides; the noble metals include palladium and one or more elements selected from among platinum and rhodium; the zirconia content in the coat layer is 0.07 mole or less per 100 g of the metal oxides contained in the coat layer; and the total content of one or more metal oxides selected from among lanthana and alkaline earth metal oxides in the coat layer is 0.05 mole or more per 100 g of the metal oxides contained in the coat layer.

6 Claims, 3 Drawing Sheets

(51) Int. Cl.
- *F01N 3/10* (2006.01)
- *F01N 3/28* (2006.01)
- *F02B 63/02* (2006.01)
- *B01D 53/86* (2006.01)
- *B01J 23/63* (2006.01)
- *B01J 23/00* (2006.01)
- *B01J 23/56* (2006.01)
- *B01J 21/04* (2006.01)

(52) U.S. Cl.
CPC .............. *B01J 23/002* (2013.01); *B01J 23/56* (2013.01); *B01J 23/58* (2013.01); *B01J 23/63* (2013.01); *F01N 3/10* (2013.01); *F01N 3/28* (2013.01); *F02B 63/02* (2013.01); *B01D 2255/1023* (2013.01); *B01D 2255/2042* (2013.01); *B01D 2255/2063* (2013.01); *B01D 2255/2065* (2013.01); *B01D 2255/2092* (2013.01); *B01J 21/04* (2013.01)

(58) Field of Classification Search
CPC ... B01J 23/58; B01J 23/63; F01N 3/10; F01N 3/28; F02B 63/02
See application file for complete search history.

(56) References Cited

U.S. PATENT DOCUMENTS

| | | | |
|---|---|---|---|
| 6,887,444 B1 * | 5/2005 | Yamamoto | B01D 53/9495 423/239.2 |
| 2010/0158780 A1 * | 6/2010 | Galligan | B01J 23/63 423/239.1 |

FOREIGN PATENT DOCUMENTS

| | | | |
|---|---|---|---|
| JP | 2001-79403 A | | 3/2001 |
| JP | 2004-275842 A | | 10/2004 |
| JP | 2004275842 A | * | 10/2004 |

OTHER PUBLICATIONS

Jul. 4, 2017 Written Opinion issued in International Application No. PCT/JP2017/018561.

* cited by examiner

EXHAUST GAS PURIFYING CATALYST FOR 2-STROKE GENERAL-PURPOSE ENGINES

FIELD

The present invention relates to an exhaust gas purifying catalyst for a 2-stroke general-purpose engine.

BACKGROUND

Exhaust gas from internal combustion engines must conform to various regulations imposed in consideration of the environment, and therefore catalysts are used to remove harmful components before discharge.

Removal performance for primarily hydrocarbons (HC), carbon monoxide (CO), and nitrogen oxides ($NO_x$) that are present in the components of exhaust gas has been an issue for exhaust gas purifying catalysts. Notably, hydrocarbons (HC) and carbon monoxide (CO) are purified by being converted to water ($H_2O$) and carbon dioxide ($CO_2$) by oxidation reaction, while nitrogen oxides ($NO_x$) are purified by conversion to nitrogen ($N_2$) by reduction reaction.

Two-stroke general purpose engines are often used in handheld type power tools such as brushcutters, blowers and chainsaws. Regulations have also been placed on exhaust gas discharge components from 2-stroke general purpose engines. In Japan, for example, they are self-regulated by the Japan Land Engine Manufacturer's Association, while laws and regulations are imposed by the Environmental Protection Agency (EPA) in the United States and regulations are imposed by the EC authority in Europe.

The regulations for exhaust gas from 2-stroke general purpose engines are particularly strict in terms of total emissions of HC components (THC). With conventional exhaust gas purifying catalysts, therefore, it has been necessary to increase the amounts of the catalysts (especially noble metals) in order to conform to the imposed regulations. This leads to greater catalyst sizes (bulk), as well as increased cost.

However, most handheld type power tools that are designed to be powered by 2-stroke general purpose engines are not very large in terms of the appliances themselves, and because the size of the exhaust system and the freedom of design are limited due to the required handleability, it has not been easy to install large catalysts. It is also preferred for the catalyst cost to be as low as possible.

In this regard, Patent Literature 1 teaches that it is possible to obtain a catalyst with high HC purification performance by adjusting the metal oxide composition of the catalyst-supporting layer, and the loading ratios of the noble metals.

CITATION LIST

Patent Literature

[PATENT LITERATURE 1] JP 2004-275842

SUMMARY

Technical Problem

The technology of Patent Literature 1 is superior for providing an exhaust gas purifying catalyst with high HC purification performance without increasing the conventional catalyst bulk and cost, and it can provide a catalyst conforming to current exhaust gas regulations for 2-stroke general purpose engines.

However, HC component emission regulations for 2-stroke general purpose engines are expected to become even more stringent in future years, and exhaust gas purifying catalysts will need to conform to increasingly heavy regulations.

The technology of Patent Literature 1 is considered to be one of the maximally effective methods for conventional catalysts, but further improvement in exhaust gas purification performance by application of that technology is already approaching its limit. In order to conform to even stricter regulations in the future, it is believed that new compositions will be necessary for exhaust gas purifying catalysts.

The present invention has been devised in light of the circumstances described above. It is therefore an object of the invention to provide an exhaust gas purifying catalyst for a 2-stroke general-purpose engine that exhibits high HC purification performance and can conform to stricter regulations.

Solution to Problem

The present invention achieves the object described above by technology which is summarized as follows.

[1] An exhaust gas purifying catalyst for a 2-stroke general-purpose engine
having a substrate and a coat layer on the substrate, wherein
the coat layer includes a noble metal and a metal oxide,
the noble metal includes palladium and one or more elements selected from platinum and rhodium,
the zirconia content of the coat layer is 0.07 mol or less per 100 g of metal oxides in the coat layer, and
the total content of one or more metal oxides selected from among lanthana and alkaline earth metal oxides in the coat layer is 0.05 mol or greater per 100 g of metal oxides in the coat layer.

[2] The exhaust gas purifying catalyst according to [1], wherein the metal oxides in the coat layer include alumina.

[3] The exhaust gas purifying catalyst according to [1] or [2], wherein the metal oxides in the coat layer include ceria.

[4] The exhaust gas purifying catalyst according to any one of [1] to [3], wherein the palladium is present in a manner diffused in the depthwise direction from the outer surface of the coat layer, the diffusion width being 60 µm or greater in the depthwise direction of the coat layer.

[5] The exhaust gas purifying catalyst according to any one of [1] to [4], wherein one or more elements selected from platinum and rhodium are present in a manner diffused in the depthwise direction from the outer surface of the coat layer, the diffusion width being 30 µm or less in the depthwise direction of the coat layer.

[6] The exhaust gas purifying catalyst according to any one of [1] to [5], wherein the one or more metal oxides selected from among lanthana and alkaline earth metal oxides are one or more metal oxides selected from the group consisting of lanthana, barium oxide and strontium oxide.

[7] The exhaust gas purifying catalyst according to [6], wherein the one or more metal oxides selected from among lanthana and alkaline earth metal oxides is lanthana.

[8] An exhaust gas purifying method which comprises purifying exhaust gas from a 2-stroke general purpose engine using the exhaust gas purifying catalyst according to any one of [1] to [7].

Advantageous Effects of Invention

According to the invention there is provided an exhaust gas purifying catalyst for a 2-stroke general-purpose engine that exhibits high HC purification performance and can conform to stricter regulations. Since the exhaust gas purifying catalyst of the invention exhibits high HC removal performance with a small amount of catalyst and with the same amount of noble metals as in conventional catalysts, it allows compact size designs and is inexpensive.

The exhaust gas purifying catalyst for a 2-stroke general-purpose engine of the invention can be suitably used in handheld type power tools such as brushcutters, blowers and chainsaws, for example.

DESCRIPTION OF EMBODIMENTS

The exhaust gas purifying catalyst for a 2-stroke general-purpose engine according to the invention
has a substrate and a coat layer on the substrate, wherein the coat layer includes a noble metal and a metal oxide,
the noble metal includes palladium and one or more elements selected from platinum and rhodium,
the zirconia content of the coat layer is 0.07 mol or less per 100 g of metal oxides in the coat layer, and
the total content of one or more metal oxides selected from among lanthana and alkaline earth metal oxides in the coat layer is 0.05 mol or greater per 100 g of metal oxides in the coat layer.

Throughout the present specification, the molar amounts of specified metal oxides per 100 g of metal oxides are the values of the masses of each metal oxide in 100 g of metal oxide used as the catalyst support, divided by the formula mass of the metal oxide. For example, if the metal oxides contain 23.1 mass % of lanthana, then the mass of lanthana in 100 g of metal oxide is expressed as 23.1 [g/100 g metal oxides], and dividing this value by the formula mass 325.81 [g/mol] of lanthana ($La_2O_3$) gives a value of 0.071 [mol/100 g metal oxides], which is used as the molar amount of lanthana per 100 g of metal oxides. The formula masses of the other metal oxides are the following values.

Zirconia: $ZrO_2$=123.22 [g/mol]
Barium oxide: $BaO$=153.33 [g/mol]
Strontium oxide: $SrO$=103.63 [g/mol]

The present inventors have devised this invention based on the following considerations for development of an exhaust gas purifying catalyst for a 2-stroke general purpose engine.

A 2-stroke general purpose engine lacks a transmission, operating simply by ON/OFF switching of the engine. The engine is driven under special conditions that produce a very large amount of exhaust gas in an ultra-rich state with an air/fuel ratio of about 11 to 13 as the A/F value and a space velocity of about 400,000/h as the SV value.

Therefore, when designing an exhaust gas purifying catalyst for a 2-stroke general-purpose engine, different considerations must be taken into account than for an automobile exhaust gas purifying catalyst with relatively low exhaust gas production near the theoretical air/fuel ratio.

Since the exhaust gas composition is in an oxygen-deficient enriched state and HC purification by oxidizing purification is not efficient, it is presumed to be advantageous for HC purification to be by steam reforming. However, when a conventional catalyst containing a significant amount of zirconia is operated under ultra-rich conditions, the HC reforming reaction proceeds to methanation, generating methane. The reaction formula is as follows when HC is propane ($C_3H_8$).

[Chemical Formula 1]

Since the methane generated by methanation is counted as HC, the HC purifying performance of the catalyst is evaluated to be low.

In an enriched state, adsorption of HC tends to poison the noble metals and facilitate their inactivation.

The present inventors therefore searched for a catalyst composition that allows HC purification by steam reforming while also minimizing generation of methane and that has reduced poisoning of noble metals, and we have devised the composition of the present invention. Specifically, the amount of zirconia in the catalyst support is restricted in order to limit HC reforming reaction to steam reforming reaction and avoid progression to methanation. At the same time, an alkaline support component selected from among lanthana and alkaline earth metal oxides was used to compensate for the steam reforming capacity exhibited by zirconia. Introduction of the alkaline support component also shifted the pH of the entire support to the alkaline end, thus limiting HC adsorption onto the support, and thus minimizing HC poisoning of the noble metals.

This combined effect of an alkaline support component under an enriched atmosphere has not been known in the prior art.

The present inventors have investigated suitable ranges for the zirconia amount and lanthana amount in the metal oxide layer for the purpose of the invention, based on the theory explained above, and have devised the present invention as a result.

Figure 1:
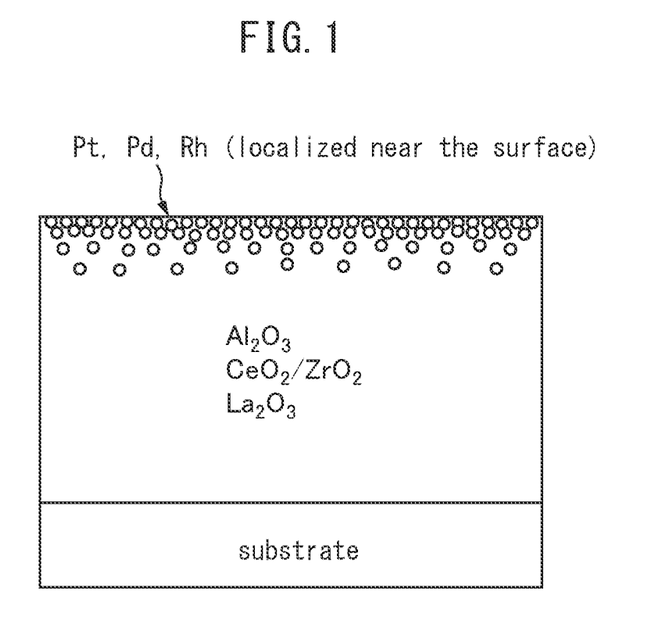
FIG. 1 is a simplified cross-sectional view showing the composition of a catalyst according to the prior art.
Figure 2:
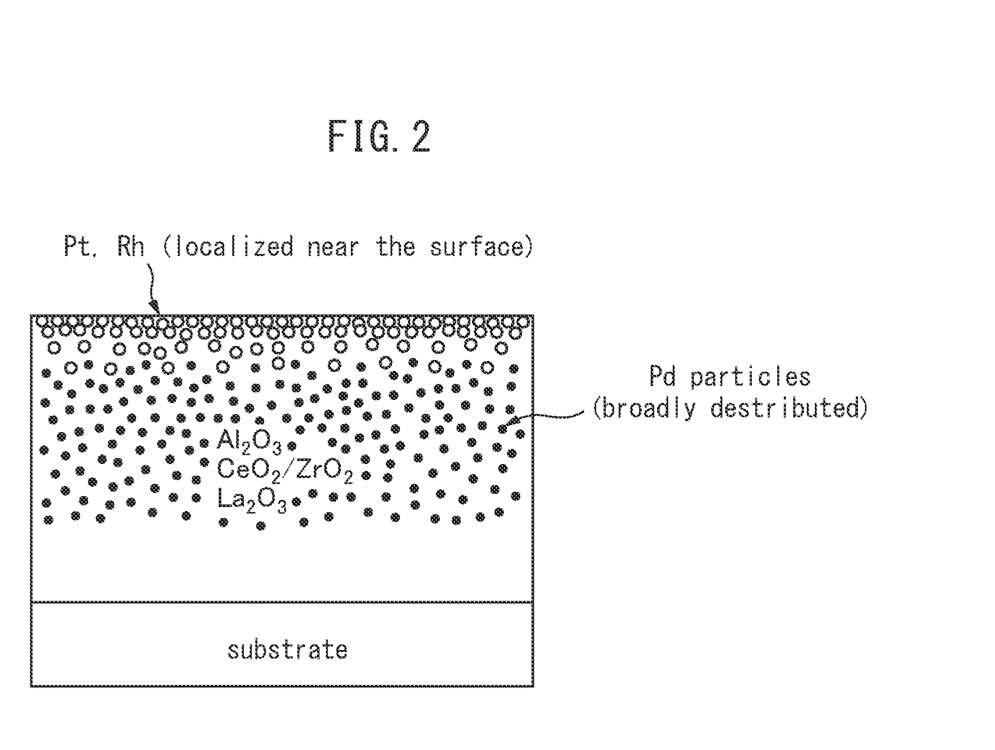
FIG. 2 is a simplified cross-sectional view showing the composition of a catalyst according to the invention.

FIG. 1 and FIG. 2 are conceptual drawings illustrating the concept of the exhaust gas purifying catalyst for a 2-stroke general-purpose engine according to a preferred embodiment of the invention, in comparison with a catalyst composition of the prior art. Both drawings are examples in which the metal oxide support contains alumina and ceria in addition to zirconia and lanthana.

FIG. 1 is a conceptual drawing showing the composition of an exhaust gas purifying catalyst according to the prior art. In the catalyst coat layer of FIG. 1, palladium, platinum and rhodium are loaded as noble metals on a metal oxide support containing zirconia, lanthana, alumina and ceria. These noble metals are all localized near the surface layer of the coat layer. Such an arrangement is advantageous in terms of the purification speed when exhaust gas has been introduced at a high space velocity, but palladium is rapidly poisoned by hydrocarbons in the exhaust gas and the catalyst quickly loses its purifying activity. Although the alkaline metal oxide lanthana is present in the metal oxide support layer of the catalyst, the suppressing effect on hydrocarbon adsorption by lanthana is thought to have no effect on palladium that is concentrated only in the surface layer.

FIG. 2 is a conceptual drawing showing the composition of an exhaust gas purifying catalyst of the invention. In the catalyst coat layer of FIG. 2 as well, palladium, platinum and rhodium are loaded as noble metals on a metal oxide support containing zirconia, lanthana, alumina and ceria. In the catalyst of FIG. 2, however, the rhodium and platinum are localized near the surface layer of the coat layer, but the palladium is broadly distributed with a fixed diffusion width in the depthwise direction of the coat layer. Having rhodium and platinum present in the surface layer in such a composition is advantageous from the standpoint of purifying activity when exhaust gas has been introduced at a high space velocity, while the suppressing effect on hydrocarbon adsorption by lanthana can be widely exhibited on all of the broadly distributed palladium, and poisoning of palladium by hydrocarbons can be effectively minimized.

The exhaust gas purifying catalyst for a 2-stroke general-purpose engine of the invention will now be described in detail. The exhaust gas purifying catalyst for a 2-stroke general-purpose engine of the invention has a substrate and a coat layer on the substrate.

<Substrate>

The substrate to be used in the exhaust gas purifying catalyst for a 2-stroke general-purpose engine of the invention may be a metal honeycomb substrate, for example. The capacity of the substrate may be set as appropriate for the appliance in which it is to be applied. For example, is may be 1 mL or greater, 5 mL or greater or 10 mL or greater, and 500 mL or lower, 250 mL or lower or 100 mL or lower, for example. The shape of the substrate may also be set as appropriate for the appliance in which it is to be applied.

<Coat Layer>

The coat layer of the exhaust gas purifying catalyst for a 2-stroke general-purpose engine of the invention contains a noble metal and a metal oxide. The metal oxide functions as a catalyst support, while the noble metal functions as an active site for exhaust gas purification.

[Metal Oxide]

The zirconia content in the metal oxide is restricted, and in its place it contains a significant amount of one or more metal oxides selected from among lanthana and alkaline earth metal oxides. The metal oxide may also contain a metal oxide other than lanthana and alkaline earth metal oxides.

The zirconia content of the metal oxide is 0.07 mol or less per 100 g of metal oxides in the coat layer. A catalyst using metal oxides with the zirconia content limited to this value or less will have methanation effectively minimized during HC purification, and will exhibit high HC purification performance as a result. The zirconia content in the metal oxides is preferably 0.05 mol or less, more preferably 0.03 mol or less and even more preferably 0.01 mol or less per 100 g of metal oxides, and it may be even be 0 mol.

The total content of one or more metal oxides selected from among lanthana and alkaline earth metal oxides (hereunder also referred to as "alkaline metal oxides") in the metal oxides is 0.05 mol or greater per 100 g of metal oxides in the coat layer. A catalyst using metal oxides containing alkaline metal oxides in this amount or greater will have accelerated HC purification by steam reforming and minimized methanation, and will thus exhibit high HC purification performance. Such a catalyst will also have the pH of the metal oxide as a whole shifted toward the alkaline end, with limited adsorption of HC, and can therefore reduce HC poisoning of the noble metals.

The total content of alkaline metal oxides in the metal oxides may be 0.07 mol or greater, 0.10 mol or greater or 0.15 mol or greater, per 100 g of metal oxides. On the other hand, in order to exhibit the effect of other components (typically one or more selected from among alumina and ceria) included in the metal oxides, the total content of alkaline metal oxides is 0.50 mol or less per 100 g of metal oxides, and it is preferably 0.25 mol or less.

The type of alkaline metal oxide is preferably one or more metal oxides selected from the group consisting of lanthana, barium oxide and strontium oxide. An alkaline metal compound containing lanthana is more preferably used, and most preferably lanthana (alone) is used as the alkaline metal oxide.

The metal oxides in the coat layer of the exhaust gas purifying catalyst for a 2-stroke general-purpose engine of the invention may also contain other metal oxides other than zirconia and alkaline metal oxides. Such other metal oxides are typically one or more metal oxides selected from among alumina and ceria.

Alumina may be included in the metal oxide of the invention for the purpose of increasing the heat resistance. In order for the alumina to exhibit its desired function, it may be included at 10 mass % or greater, 20 mass % or greater, 30 mass % or greater or 50 mass % or greater, for example, with respect to the total amount of metal oxides. In order to effectively exhibit the function of the alkaline metal oxide, on the other hand, the content is 95 mass % or less, 90 mass % or less or 80 mass % or less, for example, with respect to the total amount of metal oxides.

Ceria may be included in the metal oxides of the invention, as a component having oxygen storage capacity that can supply oxygen under enriched conditions (OSC material). In order for ceria to exhibit its desired function, it may be present at 1 mass % or greater, 2 mass % or greater or 3 mass % or greater, for example, with respect to the total amount of metal oxides. On the other hand, in order to effectively exhibit the function of the alkaline metal oxide and alumina when it is present, the content is 15 mass % or less, 10 mass % or less or 5 mass % or less, for example, with respect to the total amount of metal oxides.

The metal oxides in the coat layer of the exhaust gas purifying catalyst for a 2-stroke general-purpose engine of the invention may include metal oxides other than those mentioned above, in ranges such that the functions exhibited by each of the metal oxides are not inhibited. Neodymium oxide may be mentioned as an example of a metal oxide other than those mentioned above. The content of metal oxides other than those mentioned above is suitably 5 mass % or less or 1 mass % or less, for example, with respect to the total amount of metal oxides.

[Noble Metals]

The noble metals contained in the coat layer of the exhaust gas purifying catalyst for a 2-stroke general-purpose engine of the invention include palladium and one or more metals selected from platinum and rhodium.

In order to exhibit high HC purification performance, the content of palladium in the exhaust gas purifying catalyst for a 2-stroke general-purpose engine of the invention is preferably 0.05 g/substrate-L or greater, more preferably 1.00 g/substrate-L or greater, even more preferably 2.00 g/substrate-L or greater and most preferably 2.50 g/substrate-L or greater, as the mass of Pd per 1 L of substrate. In order to avoid excessive cost, on the other hand, it is also preferably 5.0 g/substrate-L or less, more preferably 4.00 g/substrate-L or less, even more preferably 3.50 g/substrate-L or less and most preferably 3.00 g/substrate-L or less.

The content of one or more metals selected from platinum and rhodium in the exhaust gas purifying catalyst for a 2-stroke general-purpose engine of the invention is preferably 0.01 g/substrate-L or greater, more preferably 0.05 g/substrate-L or greater, even more preferably 0.1 g/substrate-L or greater and most preferably 0.5 g/substrate-L or greater, as their total mass per 1 L of substrate. In order to avoid excessive cost, on the other hand, it is also preferably 1.5 g/substrate-L or less, more preferably 1.0 g/substrate-L or less and even more preferably 0.8 g/substrate-L or less.

If the noble metals include platinum, oxidizing purification of HC will be accelerated. From this viewpoint, the content of platinum per 1 L of substrate in the exhaust gas purifying catalyst for a 2-stroke general-purpose engine of the invention is preferably 0.01 g/substrate-L or greater, more preferably 0.05 g/substrate-L or greater and even more preferably 0.1 g/substrate-L or greater. In order to avoid excessive cost, on the other hand, the platinum content per 1 L of substrate is also preferably 1.5 g/substrate-L or less, more preferably 1.0 g/substrate-L or less and even more preferably 0.8 g/substrate-L or less.

The exhaust gas purifying catalyst for a 2-stroke general-purpose engine of the invention is expected to be operated with the exhaust gas composition in an oxygen-deficient enriched state. The catalyst of the invention is therefore constructed on the assumption that removal of HC is to be carried out not by oxidizing purification but mainly by steam reforming. From this viewpoint, the catalyst of the invention does not necessarily have to contain platinum. One advantageous effect of the invention is that high HC removal performance can be exhibited by steam reforming even when absolutely no expensive platinum is added.

When the noble metals include rhodium, reduction purification of $NO_x$ is accelerated. From this viewpoint, the content of rhodium per 1 L of substrate in the exhaust gas purifying catalyst for a 2-stroke general-purpose engine of the invention is preferably 0.005 g/substrate-L or greater, more preferably 0.01 g/substrate-L or greater and even more preferably 0.05 g/substrate-L or greater. In order to avoid excessive cost, on the other hand, the rhodium content per 1 L of substrate is also preferably 1.0 g/substrate-L or less, more preferably 0.5 g/substrate-L or less and even more preferably 0.25 g/substrate-L or less.

In the exhaust gas purifying catalyst for a 2-stroke general-purpose engine of the invention, the one or more elements selected from platinum and rhodium preferably include at least rhodium, and more preferably include both platinum and rhodium.

The palladium in the coat layer of the exhaust gas purifying catalyst for a 2-stroke general-purpose engine of the invention is preferably present in a manner diffused from the outer surface of the coat layer in the depthwise direction. If the palladium is present in a manner diffused from the outer surface of the coat layer in the depthwise direction, most of the palladium will be present near the alkaline metal oxides included in the metal oxides of the coat layer. With a composition having such an arrangement, it is possible to very effectively avoid HC poisoning of the palladium due to the HC adsorption-inhibiting effect of the support which has a pH shifted toward the alkali end, while the HC decomposition and removal performance is also improved by the steam reforming effect of the alkaline metal oxides (especially lanthana).

The diffusion width of the palladium in the coat layer of the exhaust gas purifying catalyst for a 2-stroke general-purpose engine of the invention is preferably 60 µm or greater from the surface of the coat layer in the depthwise direction. The diffusion width is preferably at least as large as this value since HC poisoning of the palladium will be minimized and decomposition and removal of HC can be carried out with high activity. On this basis, the diffusion width of the palladium is more preferably 100 µm or greater, yet more preferably 150 µm or greater, and may even be 200 µm or greater, 250 µm or greater, 300 µm or greater or 350 µm or greater. The arrangement of palladium to an excessively deep location, on the other hand, will accommodate palladium that does not contribute to exhaust gas purification, which is undesirable from the standpoint of cost. From this viewpoint, a diffusion width of palladium of 1 mm or less, or 500 µm or less, is appropriate based on the considerations mentioned above.

In the coat layer of the exhaust gas purifying catalyst for a 2-stroke general-purpose engine of the invention, the one or more elements selected from platinum and rhodium are preferably localized near the surface of the coat layer from the viewpoint of maximizing the reactivity with exhaust gas introduced at a high space velocity. From this viewpoint, the diffusion widths of platinum and rhodium are each preferably 30 µm or less from the surface of the coat layer in the depthwise direction. The value is preferably 25 µm or less, or even 20 µm or less. On the other hand, since a coat layer with an excessively low diffusion width is difficult to prepare, the diffusion widths of platinum and rhodium may each be 5 µm or greater or 10 µm or greater from the surface of the coat layer in the depthwise direction, in order to avoid unnecessary cost increase.

The diffusion widths of the noble metals can be analyzed using an electron beam microanalyzer (EPMA). The depth from the surface of the coat layer of the exhaust gas purifying catalyst for a 2-stroke general-purpose engine of the invention, at which the noble metal becomes undetectable in EPMA analysis, may be used as the diffusion width of that noble metal.

<Method for Producing Exhaust Gas Purifying Catalyst for 2-Stroke General-Purpose Engine>

The exhaust gas purifying catalyst for a 2-stroke general-purpose engine of the invention can be easily produced by a publicly known method, alternatively with appropriate modifications applied by a person skilled in the art, except for adjustment of the diffusion widths of the noble metals as described above.

Specifically, it may be a method of forming the metal oxide layer on an appropriate substrate, and then loading the noble metal.

Formation of the metal oxide layer on the substrate may be by a method of, for example, preparing a solution or slurry containing one or more selected from among metal oxides and their precursors, coating the slurry onto the substrate, and firing it if necessary.

The metal oxide precursor may be a sulfate, carbonate or nitrate of the metal. Specific examples include lanthanum carbonate, barium sulfate and strontium sulfate.

Water is an appropriate solvent for the solution or slurry.

The coating method may be a publicly known method such as a dipping method, pouring method or pushing up method, without any restrictions. After coating, a step may be carried out to remove the solvent if necessary.

The optional firing may be by a method of heating at a temperature of 400° C. or higher or 500° C. or higher, for example, and 700° C. or lower or 600° C. or lower, for example, for a period of 0.5 hour or longer or 1.0 hours or longer, for example, and 3.0 hours or less or 2.0 hours or less, for example.

The method of forming the metal oxide layer, as a preferred mode of the invention, may be a method in which a substrate is coated with a slurry containing:
an alkaline metal oxide precursor, and
an oxide or complex oxide of one or more metals selected from among zirconium and cerium, and alumina,
after which it is fired.

The noble metal is then loaded onto the metal oxide layer formed in this manner. Loading of the noble metal is preferably by a method of impregnating the metal oxide layer formed on the substrate as described above, with a solution containing the noble metal precursor, and then firing it.

The noble metal precursor may be:
a palladium precursor such as palladium nitrate, palladium chloride or palladium sulfate, for example;
a platinum precursor such as platinum nitrate, for example; or
a rhodium precursor such as rhodium chloride, sodium rhodium chloride, rhodium pentamine chloride or carbonyl acetyl rhodium, for example.

Water is suitable as a solvent for the noble metal precursor solution.

The firing that is preferably carried out after impregnation with the noble metal precursor solution may be by a method of heating at a temperature of 100° C. or higher or 200° C. or higher, for example, and 500° C. or lower or 400° C. or lower, for example, for a period of 0.25 hour or longer or 0.5 hour or longer, for example, and 3.0 hours or less or 2.0 hours or less, for example.

The noble metal precursor solution to be impregnated into the metal oxide layer may be separated into two: a palladium precursor solution and a precursor solution of one or more metals selected from platinum and rhodium, appropriately modifying their impregnation order, solution concentration and solution viscosity, to adjust the diffusion width of each of the noble metals.

For example, by first impregnating the metal oxide layer with the palladium precursor solution and then impregnating it with a precursor solution of one or more metals selected from platinum and rhodium and firing, it is possible to set a relatively wider diffusion width for palladium and a relatively narrower diffusion width for the one or more metals selected from platinum and rhodium. Separate firings may also be carried out after impregnating each noble metal precursor solution.

If the noble metal concentration of the noble metal precursor solution is increased (concentrated) and/or the viscosity of the noble metal solution is increased, then it will be possible to reduce the diffusion width of the noble metal in the resulting catalyst. Conversely, if the noble metal concentration of the noble metal precursor solution is decreased (rarefied) and/or the viscosity of the noble metal solution is decreased, then it will be possible to increase the diffusion width of the noble metal in the resulting catalyst. The solution viscosity can be adjusted, for example, by adding a surfactant or solvent-soluble polymer to the solution.

By using any of the aforementioned methods, or any two or more in combination, it is possible to adjust the diffusion widths of the noble metals to within the desired ranges.

<Exhaust Gas Purifying Method>

The exhaust gas purifying method of the invention comprises purifying exhaust gas from a 2-stroke general purpose engine using an exhaust gas purifying catalyst. Specifically, the construction is such that the exhaust gas purifying catalyst of the invention is situated at any location of the exhaust system of the 2-stroke general purpose engine, and exhaust gas generated during operation of the engine passes through the catalyst. With such a construction it is possible to purify exhaust gas generated during operation of the 2-stroke general purpose engine.

The placement location of the catalyst in the exhaust system is preferably a location where the inlet gas temperature is 250° C. to 500° C.

The exhaust gas purifying method of the invention allows highly efficient purification of exhaust gas from a 2-stroke general purpose engine that generates large amounts of exhaust gas in an enriched state, and in particular it can yield purified gas with a high degree of reduction of THC.

EXAMPLES

Reference Example 1

A metal honeycomb substrate (35 mmφ×20 mm) was coated with a metal oxide support containing alumina, ceria or a ceria-zirconia complex oxide, and lanthana, and then palladium, platinum and rhodium were loaded to prepare an exhaust gas purifying catalyst. The amounts of zirconia and lanthana in the metal oxide support were changed to obtain multiple catalysts with different contents.

Using the obtained catalysts, their THC purification rates for a model exhaust gas containing CO, $CO_2$, $O_2$, NO, $C_3H_8$, $C_3H_6$, $H_2O$ and $N_2$ were measured under 2-stroke general purpose engine exhaust gas simulating conditions with a gas flow rate of 25 L/min, an air/fuel ratio of A/F=12.5, a space velocity of SV=111,940 $h^{-1}$ and an inlet gas temperature of 350° C. The measurement results are shown in FIG. 3 and FIG. 4.

Figure 3:
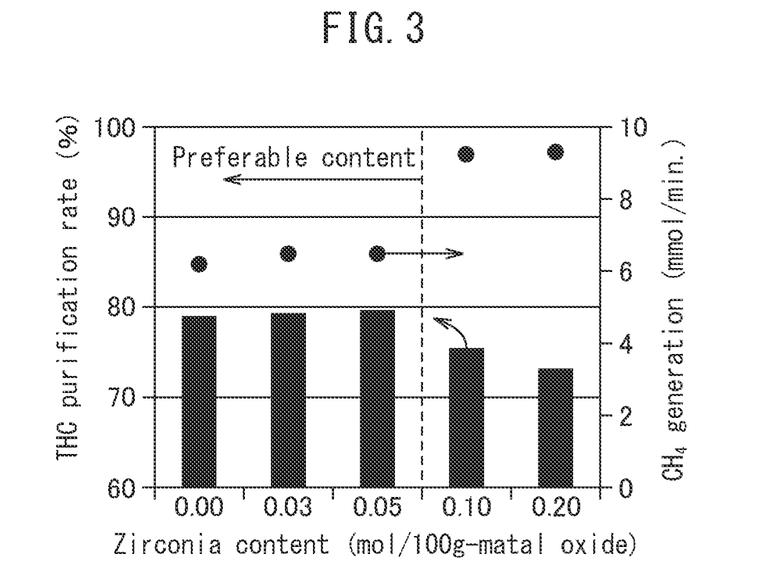
FIG. 3 is a graph showing the relationship between methane production and THC purification rate, and amount of zirconia among the metal oxides.

Referring to FIG. 3, it is seen that:
when the amount of zirconia exceeds 0.07 mol per 100 g of metal oxides, the amount of methane generation exceeds 9 mmol/min and the THC purification rate is low at 75% or lower; whereas
when the amount of zirconia is 0.07 mol or less per 100 g of metal oxides, the amount of methane generation is about 6 mmol/min or less and a high THC purification rate of about 80% is exhibited.

Figure 4:
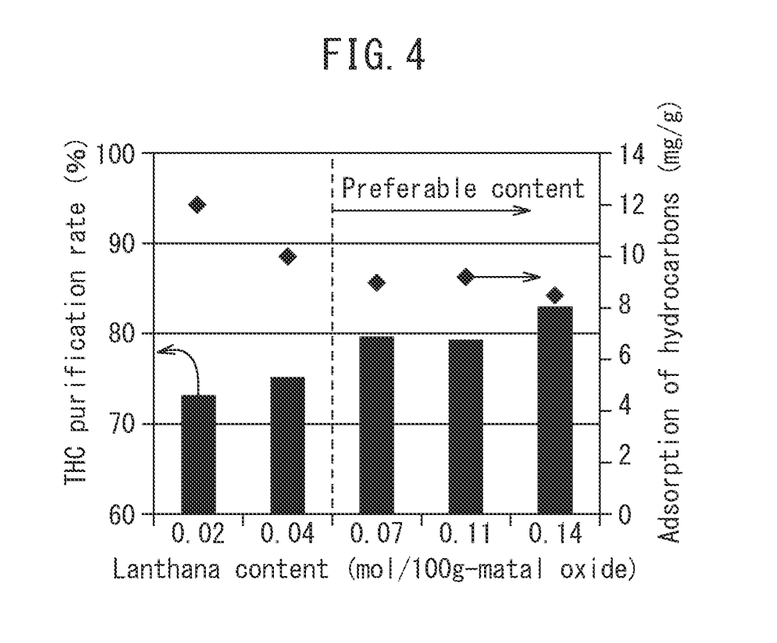
FIG. 4 is a graph showing the relationship between hydrocarbon adsorption and THC purification rate, and amount of lanthana among the metal oxides.

Referring to FIG. 4, it is seen that:
when the amount of lanthana per 100 g of metal oxide is less than 0.05 mol, the adsorption of hydrocarbons per metal oxide supported mass is high at about 10 mg/g or greater, and the THC purification rate is low at 75% or lower; whereas
when the amount of lanthana is 0.05 mol or greater per 100 g of metal oxides, the adsorption of hydrocarbons per metal oxide supported mass is about 9 mg/g or less, and a high THC purification rate about equal to or exceeding 80% is exhibited.

Reference Example 2

An exhaust gas purifying catalyst of the prior art was then compared with a typical example of an exhaust gas purifying catalyst of the invention.

A model experiment was carried out in the same manner as Reference Example 1 above,
using an exhaust gas purifying catalyst with a zirconia amount of 0.2 mol and a lanthana amount of 0.02 mol per 100 g of metal oxides as the example of the prior art, and using an exhaust gas purifying catalyst with a zirconia amount of 0.05 mol or less and a lanthana amount of 0.07 mol or greater per 100 g of metal oxides as the typical example of the invention.

Figure 5:
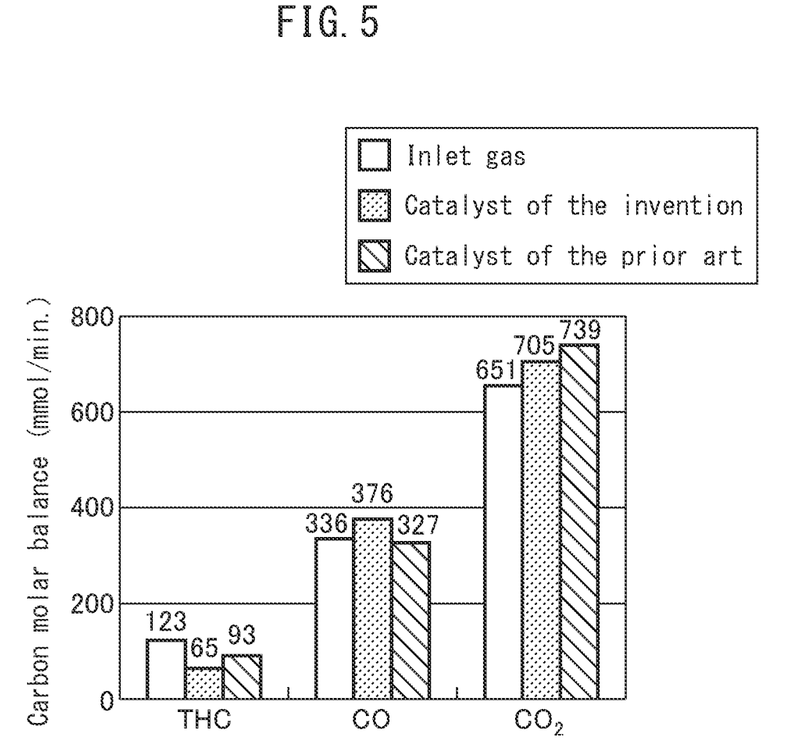
FIG. 5 is a graph for exhaust gas purification performance (carbon molar balance), showing a comparison between typical examples of an exhaust gas purifying catalyst of the prior art and an exhaust gas purifying catalyst of the invention.

The obtained results are shown in FIG. 5, in terms of the carbon molar balance. Referring to FIG. 5, it is seen that the exhaust gas purifying catalyst of the invention exhibits highly superior THC removal performance.

Examples 1 to 8 and Comparative Examples 1 and 2

[Preparation of Catalysts]

A ceria-zirconia-based complex oxide (Ce:Zr=36:64 (molar ratio), ceria-zirconia purity: 94.9 mass %), alumina, and the lanthana or alkaline earth metal oxide precursors listed in Table 1, were dispersed in water at quantity ratios so that the post-firing oxide compositions were as listed in Table 1, to prepare slurries.

A metal honeycomb substrate (35 mmφ, length: 20 mm) was coated with each slurry and fired for 1.0 hour in air at 500° C. to form a metal oxide layer on the substrate.

Next, each substrate with the metal oxide layer was immersed in a Pd nitrate aqueous solution and fired for 1.0 hour at 250° C., and further immersed in an aqueous solution containing Pt nitrate and Rh nitrate (Examples 1 to 3, 4 and 5) or an aqueous solution containing Rh nitrate (Examples 4, 7 and 8 and Comparative Examples 1 and 2) and fired for 1.0 hour at 250° C., to prepare exhaust gas purifying catalysts having the following noble metal amounts and the noble metal diffusion widths listed in Table 1.

Pd: 2.5 g/L
Pt: 0.5 g/L (Examples 1 to 3, 4 and 5) or 0 g/L (Examples 4, 7 and 8 and Comparative Examples 1 and 2)
Rh: 0.1 g/L The units "g/L" for the noble metal amounts indicate noble metal mass per 1 L of substrate capacity.

The noble metal diffusion width was controlled by appropriately adjusting the preparation conditions such as the concentration of the noble metal aqueous solution used. The noble metal diffusion width was evaluated by EPMA, analyzing from the surface of the coat layer in the depthwise direction, and the depth at which the concentration of the noble metal element being analyzed was below the detection limit was determined and the value was used as the diffusion width.

[Catalyst Evaluation]

The total hydrocarbon (THC) purification rate was examined for each of the prepared catalysts using a model gas with the following composition, under enriched and high gas quantity conditions with a gas flow rate of 25 L/min, an air/fuel ratio of A/F=12.5 and a space velocity of SV=111,940 $h^{-1}$, and with an inlet gas temperature of 350° C. The results are shown in Table 1.

TABLE 1

| | Noble metal Diffusion width (μm) | | | Metal oxide | | | | | | | | THC purification rate (%) |
|---|---|---|---|---|---|---|---|---|---|---|---|---|
| | | | | Alumina | Ceria | Zirconia | | La, Ba or Sr oxide | | | | |
| | Pd | Pt | Rh | Mass % | Mass % | Mass % | mol/100 g-oxide | Type | Mass % | mol/100 g-oxide | Other Mass % | Mass % total |
| Example 1 | 200 | 30 | 20 | 65.2 | 4.9 | 6.2 | 0.050 | Lanthana | 23.1 | 0.071 | 0.6 | 100 | 79.7 |
| Example 2 | 30 | 30 | 20 | 65.2 | 4.9 | 6.2 | 0.050 | Lanthana | 23.1 | 0.071 | 0.6 | 100 | 75.3 |
| Example 3 | 400 | 30 | 20 | 65.2 | 4.9 | 6.2 | 0.050 | Lanthana | 23.1 | 0.071 | 0.6 | 100 | 75.3 |
| Example 4 | 400 | — | 20 | 65.2 | 4.9 | 6.2 | 0.050 | Lanthana | 23.1 | 0.071 | 0.6 | 100 | 76.1 |
| Example 5 | 200 | 30 | 20 | 86.8 | 0 | 2.5 | 0.020 | Ba oxide | 10.7 | 0.070 | 0 | 100 | 74.7 |
| Example 6 | 200 | 30 | 20 | 90.2 | 0 | 2.5 | 0.020 | Sr oxide | 7.3 | 0.070 | 0 | 100 | 76.5 |
| Example 7 | 200 | — | 20 | 77.2 | 0 | 0 | 0 | Lanthana | 22.8 | 0.070 | 0 | 100 | 79.1 |
| Example 8 | 200 | — | 20 | 23.1 | 4.9 | 6.2 | 0.050 | Lanthana | 65.2 | 0.200 | 0.6 | 100 | 82.0 |
| Comp. Example 1 | 200 | — | 20 | 39.6 | 0 | 37.0 | 0.300 | Lanthana | 22.8 | 0.070 | 0.6 | 100 | 65.3 |
| Comp. Example 2 | 200 | — | 20 | 81.7 | 4.9 | 6.2 | 0.050 | Lanthana | 6.5 | 0.020 | 0.6 | 100 | 73.3 |

As shown in Table 1, inferior THC purification performance was exhibited by the catalyst of Comparative Example 1 wherein the zirconia content in the metal oxides of the coat layer was a large amount exceeding the prescribed range of the invention, and the catalyst of Comparative Example 2 wherein the zirconia content was within the prescribed range of the invention but the lanthana content was lower than the prescribed range of the invention. In contrast, the catalysts of Examples 1 to 8, which satisfied the conditions prescribed by the invention, were all verified to have high HC purification performance.

Example 9

[Preparation of Catalyst]
An exhaust gas purifying catalyst was prepared in the same manner as Example 1 above, except that instead of carrying out immersion of the substrate with a metal oxide layer in the noble metal aqueous solution and its firing in two stages for Pd and for Pt and Rh, the two stages were immersion in a Pd nitrate aqueous solution and an aqueous solution containing Pt nitrate and firing at 250° C. for 1.0 hour, followed by immersion in an aqueous solution containing Rh nitrate and firing at 250° C. for 1.0 hour.

[Catalyst Evaluation]
The catalyst prepared as described above were evaluated in the same manner as Example 1.

Example 10

[Preparation of Catalyst]
An exhaust gas purifying catalyst was prepared in the same manner as Example 1 above, except that instead of carrying out immersion of the substrate with a metal oxide layer in the noble metal aqueous solution and its firing in two stages for Pd and for Pt and Rh, the two stages were immersion in a Pd nitrate aqueous solution and an aqueous solution containing Rh nitrate and firing at 250° C. for 1.0 hour, followed by immersion in an aqueous solution containing Pt nitrate and firing at 250° C. for 1.0 hour.

[Catalyst Evaluation]
The catalyst prepared as described above were evaluated in the same manner as Example 1.

The evaluation results for Examples 9 and 10 are shown in Table 2 together with the evaluation results for Example 1.

TABLE 2

| | Noble metal Diffusion width (μm) | | | Metal oxide | | | | | | | | THC purification rate (%) |
|---|---|---|---|---|---|---|---|---|---|---|---|---|
| | | | | Alumina | Ceria | Zirconia | | La, Ba or Sr oxide | | | Other | |
| | Pd | Pt | Rh | Mass % | Mass % | Mass % | mol/100 g-oxide | Type | Mass % | mol/100 g-oxide | Mass % | Mass % total |
| Example 1 | 200 | 30 | 20 | 65.2 | 4.9 | 6.2 | 0.050 | Lanthana | 23.1 | 0.071 | 0.6 | 100 | 79.7 |
| Example 9 | 200 | 200 | 20 | 74.7 | 0 | 2.5 | 0.020 | Lanthana | 22.8 | 0.070 | 0 | 100 | 70.7 |
| Example 10 | 200 | 30 | 100 | 74.7 | 0 | 2.5 | 0.020 | Lanthana | 22.8 | 0.070 | 0 | 100 | 68.3 |

Judging from Table 2, the catalyst of Example 1 which had a wide diffusion width for Pd and narrow diffusion widths for Pt and Rh was verified to exhibit higher HC purification performance compared to the catalyst of Example 9 which had a wide diffusion width for Pt, or the catalyst of Example 10 which had a wide diffusion width for Rh.

The invention claimed is:
1. An exhaust gas purifying catalyst for a 2-stroke general-purpose engine having a substrate and a coat layer on the substrate, wherein
the coat layer includes noble metals and one or more metal oxides,
the noble metals include palladium and one or more elements selected from platinum and rhodium, wherein the palladium is present in a form diffused in a depthwise direction from an outer surface of the coat layer, a diffusion width of the palladium being 60 μm or greater in the depthwise direction of the coat layer, and wherein the one or more elements selected from plati- num and rhodium are present in a form diffused in the depthwise direction from the outer surface of the coat layer, a diffusion width of the one or more elements selected from platinum and rhodium being 30 μm or less in the depthwise direction of the coat layer, the one or more metal oxides include lanthana and do not include any additional alkaline earth metal oxides, a zirconia content in the coat layer is 0.07 mol or less per 100 g of metal oxides in the coat layer, a ceria content in the coat layer is 3 mass % or greater and 5 mass % or less with respect to the total amount of metal oxides in the coat layer, and a lanthana content in the coat layer is 0.07 mol or greater and 0.25 mol or less per 100 g of metal oxides in the coat layer.

2. The exhaust gas purifying catalyst according to claim 1, wherein the metal oxides in the coat layer include alumina.

3. An exhaust gas purifying method, which comprises purifying exhaust gas from a 2-stroke general purpose engine using the exhaust gas purifying catalyst according to claim 1.

4. The exhaust gas purifying catalyst according to claim 1, wherein the zirconia content of the coat layer is 0.03 mol or less per 100 g of metal oxides in the coat layer.

5. The exhaust gas purifying method according to claim 3, wherein a placement location of the exhaust gas purifying catalyst in an exhaust system is a location where an inlet gas temperature is 250° C. to 500° C.

6. The exhaust gas purifying method according to claim 3, wherein the exhaust gas purifying method includes HC purification by steam reforming.

* * * * *